United States Patent [19]
Williams et al.

[11] Patent Number: 5,995,548
[45] Date of Patent: Nov. 30, 1999

[54] SIGNALING METHOD USING MULTIPLE MODULUS SHELL MAPPING

[75] Inventors: Richard G. C. Williams, San Diego; Andy L. Norrell; Scott A. Lery, both of Nevada City, all of Calif.

[73] Assignee: 3Com Corporation, Santa Clara, Calif.

[21] Appl. No.: 08/888,201

[22] Filed: Jul. 7, 1997

Related U.S. Application Data

[60] Provisional application No. 60/030,843, Nov. 15, 1996.

[51] Int. Cl.$^6$ .................................................. H04B 14/04
[52] U.S. Cl. ............................................................ 375/242
[58] Field of Search ................................... 375/342, 247, 375/244, 295, 298, 261, 279, 308, 242; 371/37.01, 37.8, 37.7, 43.1

[56] References Cited

U.S. PATENT DOCUMENTS

| | | |
|---|---|---|
| 4,882,726 | 11/1989 | Lang et al. . |
| 4,891,774 | 1/1990 | Bradley . |
| 4,941,154 | 7/1990 | Wei . |
| 5,103,227 | 4/1992 | Betts . |
| 5,111,162 | 5/1992 | Hietala et al. . |
| 5,185,763 | 2/1993 | Krishnan ................................. 375/295 |
| 5,230,010 | 7/1993 | Betts et al. . |
| 5,280,503 | 1/1994 | Betts et al. . |
| 5,406,583 | 4/1995 | Dagdeviren ................................. 375/5 |
| 5,428,641 | 6/1995 | Long ........................................ 375/295 |
| 5,465,273 | 11/1995 | Cole ........................................ 375/296 |
| 5,598,435 | 1/1997 | Williams . |
| 5,659,578 | 8/1997 | Alamouni et al. ....................... 375/261 |
| 5,822,371 | 10/1998 | Goldstein et al. ....................... 375/242 |
| 5,838,724 | 11/1998 | Cole et al. .............................. 375/222 |

FOREIGN PATENT DOCUMENTS

| | | |
|---|---|---|
| 0634856A | 1/1995 | European Pat. Off. . |
| 0725487A2 | 8/1996 | European Pat. Off. . |
| WO9119362 | 12/1991 | WIPO . |
| WO9217972 | 3/1992 | WIPO . |
| WO9618261 | 12/1995 | WIPO . |
| WO9808329 | 2/1998 | WIPO . |

OTHER PUBLICATIONS

Hodgkiss B: "*DSP Implementation Considerations in High-Speed Telephone Modems*," DSP '97 Conference Proceedings, Proceedings of DSP '97, Esher, UK, Dec. 3–4, 1997, Dec. 3, 1997, Kingston Upon Thames, UK, Badger Events, UK, pp. 77–84, XP000199773.

Kalet I et al: "*The Capacity of PCM Voiceband Channels*," Proceedings of the International Conference on Communications (ICC), Geneva, May 23–26, 1993, vol. 1, May 23, 1993, Institute of Electrical and Electronics Engineers, pp. 507–511, XP000371143.

Anonymous: "Queue Analysis of Incoming and Outgoing T1 Signalling Bits" IBM Technical Disclosure Bulletin, vol. 32, No. 7, Dec. 1989, New York, US, pp. 358–362, XP002067700.

(List continued on next page.)

*Primary Examiner*—Chi H. Pham
*Assistant Examiner*—Emmanuel Bayard
*Attorney, Agent, or Firm*—McDonnell Boehnen Hulbert & Berghoff

[57] ABSTRACT

A combined frame mapping technique that uses aspects of Minimum Modulus Conversion (MMC) and Shell Mapping (SM) to map data bits to a sequence of data symbols, or points. The apparatus includes a shell mapper to generate ring indices from K data bits and a modulus converter to select the signal points from within the ring based on B data bits. The apparatus and method permits the use of constellations having any integer number of points per ring. Variations in the constellations from time-slot to time-slot within a frame are also accommodated. The number of rings in each constellation remains constant, but the moduli vary. MMSM produces $d_{min}$ equal to the best of MMC and SM, and in some cases $d_{min}$, may be better than that for either MMC or SM.

13 Claims, 4 Drawing Sheets

OTHER PUBLICATIONS

Vedat Eyuboglu, M et al. "Advanced Modulation Techniques for V.Fast," European Transactions on Telecommunications and Related Technologies, vol. 4, No. 3, May 1, 1993, Milano, Italy, pp. 243–256, XP00385751, see page 247, paragraph 4.1, see figures 2,A1.

"Modem Operating At Data Signalling Rates Of Up To 28,800 Bit/s For Use On The General Switched Telephone Network And On Leased Point–To–Point 2–Wire Telephone–Type Circuits," ITU–T Recommendation V.34, Sep. 1994, Geneva, XP002067701 cited in the application, see page 18, paragraph 9.4–p. 20, paragraph 9.5.

5,995,548

SIGNALING METHOD USING MULTIPLE MODULUS SHELL MAPPING

RELATED APPLICATION

This application claims the benefit under 35 U.S.C. § 119(e) of U.S. Provisional Patent Application Ser. No. 60/030,843, filed Oct. 15, 1996, entitled "Efficient Data Transmission Over Digital Telephone Networks using Multiple Modulus Conversion" for all common subject matter disclosed therein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to a method and device for selecting data symbols to be transmitted in a digital communication system. Although the invention provides a method of signal point mapping and may be applied to any data communication system, it is particularly well suited for use in systems where the selection of constellation points is subject to relatively strict criteria, e.g., where signal points within a constellation are not equally spaced, or where a constellation or constituent sub-constellations may contain a number of points that is not a power of two. The method described herein is also well suited for the case where the number of elements within the constellations varies from symbol to symbol.

Such restrictions are encountered in communication systems that use the public digital telephone network where one side of the communication link (typically a server) has direct digital access to the network. In such a system the constellation selection is limited in part by the presence of Robbed-Bit-Signaling (RBS) and/or a Network Digital Attenuators (NDA), and power constraints imposed by government (e.g., FCC) regulations. These techniques also can be used to help minimize the impact of RBS/NDA on the data rate over such channels.

B. Description of the Related Art

As stated above, the signaling method and device described herein may be used in many types of digital communication systems. Generally, modulation techniques for the transmission of digital information involve modulating the amplitude and phase of a carrier frequency. A baseband signal (an unmodulated information sequence such as a train of pulses of various amplitudes) may be used to modify the amplitude of a carrier frequency sine wave. Because a carrier may also be separated into orthogonal cosine and sine components (also referred to as inphase (I) and quadrature (Q) channels), a modulated carrier may be thought of as the sum of a modulated sine wave and a modulated cosine wave.

As is well known in the art, a two-dimensional plane, or I-Q plane, is used as a shorthand notation to represent the amplitude and phase of the carrier. The signals that make up a signal constellation are represented as points in the I-Q plane, which are usually set out in a grid-like fashion. A particular signal point may be specified as a coordinate pair in the I-Q plane. The points in the I-Q plane are also generally referred to as a baseband representation of the signal because the points represent the amplitudes by which the sine and cosine components of a carrier will be modified. Each "signal point" is also referred to herein as a "symbol."

While the invention described herein is applicable to systems that use modulated carriers as described above, the preferred embodiments are essentially baseband systems that do not involve the modulation of a carrier. Consequently, the signal points are selected from a single-dimensional signal space, as opposed to a two-dimensional inphase/quadrature signal space. The system for which the invention is particularly well suited uses the public digital telephone network.

1. Digital Telephone Network

For many years the public digital telephone network (DTN) has been used for data transmission between modems. Typically, a modulated carrier is sent over a local loop to a service provider (e.g., a Regional Bell Operating Company), whereupon the service provider quantizes the signal for transmission through the DTN. A service provider that is located near the receiving location converts the digital signal back to an analog signal for transmission over a local loop to the receiving modem. This system is limited in the maximum achievable data rate at least in part by the sampling rate of the quantizers, which is typically 8 kHz (which rate is also the corresponding channel transmission rate, or clock rate, of the DTN).

Furthermore, the analog-to-digital (A/D) and digital-to-analog (D/A) conversions are typically performed in accordance with a non-linear quantizing rule. In North America, this conversion rule is known as $\mu$-law. A similar non-linear sampling technique known as A-law is used in certain areas of the world such as Europe. The non-linear A/D and D/A conversion is generally performed by a codec (coder/decoder) device located at the interfaces between the DTN and local loops.

It has been recognized that a data distribution system using the public telephone network can overcome certain aspects of the aforesaid limitations by providing a digital data source connected directly to the DTN, without an intervening codec. In such a system, the telephone network routes digital signals from the data source to a client's local subscriber loop without any intermediary analog facilities, such that the only analog portion of the link from the data source to the client is the client's local loop (plus the associated analog electronics at both ends of the loop). The only codec in the transmission path is the one at the DTN end of the client's subscriber loop.

FIG. 1 shows a block diagram of a data distribution system. The system includes a data source 10, or server, having a direct digital connection 30 to a digital telephone network (DTN) 20. A client 40 is connected to the DTN 30 by a subscriber loop 50 that is typically a two-wire, or twisted-pair, cable. The DTN routes digital signals from the data source 10 to the client's local subscriber loop 50 without any intermediary analog facilities such that the only analog portion of the link from the server 10 to the client 40 is the subscriber loop 50. The analog portion thus includes the channel characteristics of the subscriber loop 50 plus the associated analog electronics at both ends of the subscriber loop 50. The analog electronics are well known to those skilled in the art and typically include a subscriber line interface card at the central office that includes a codec, as well as circuitry used to generate and interpret call progress signals (ring voltage, on-hook and off-hook detection, etc.).

In the system of FIG. 1, the only D/A converter in the transmission path from the server 10 to the client 40 is located at the DTN 20 end of the subscriber loop 50. It is understood that the client-side, or subscriber-side, equipment may incorporate an A/D and D/A for its internal signal processing, as is typical of present day modem devices. For the reverse channel, the only A/D converter in the path from the client 40 to the server 10 is also at the DTN 20 end of the subscriber loop 50.

In the system of FIG. 1, the server 10, having direct digital access to the DTN 20 may be a single computer, or may include a communications hub that provides digital access to a number of computers or processing units. Such a hub/server is disclosed in U.S. Pat. No. 5,528,595, issued Jun. 18, 1996, the contents of which is incorporated herein by reference. Another hub/server configuration is disclosed in U.S. Pat. No. 5,577,105, issued Nov. 19, 1996, the contents of which is also incorporated herein by reference.

In the system shown in FIG. 1, digital data can be input to the DTN 20 as 8-bit bytes (octets) at the 8 kHz clock rate of the DTN. This is commonly referred to as a DS-0 signal format. At the interface between the DTN 20 and the subscriber loop 50, the DTN 20 codec converts each byte to one of 255 analog voltage levels (two different octets each represent 0 volts) that are sent over the subscriber loop 50 and received by a decoder at the client's location. The last leg of this system, i.e., the local loop 50 from the network codec to the client 40, may be viewed as a type of baseband data transmission system because no carrier is being modulated in the transmission of the data. The baseband signal set contains the positive and negative voltage pulses output by the codec in response to the binary octets sent over the DTN. The client 40, as shown in FIG. 1, may be referred to herein as a PCM modem.

FIG. 3 shows a $\mu$-law to linear conversion graph for one-half of the $\mu$-law codeword set used by the DTN 20 codec. As shown in FIG. 3, the analog voltages (shown as decimal equivalents of linear codewords having 16 bits) corresponding to the quantization levels are non-uniformly spaced and follow a generally logarithmic curve. In other words, the increment in the analog voltage level produced from one codeword to the next is not linear, but depends on the mapping as shown in FIG. 3. Note that the vertical scale of FIG. 3 is calibrated in integers from 0 to 32,124. These numbers correspond to a linear 16-bit A/D converter. As is known to those of ordinary skill in the art, the sixteenth bit is a sign bit which provides integers from 0 to −32124 which correspond to octets from 0 to 127, not shown in FIG. 3. Thus FIG. 3 can be viewed as a conversion between the logarithmic binary data and the corresponding linear 16-bit binary data. It can also be seen in FIG. 3 that the logarithmic function of the standard conversion format is approximated by a series of 8 linear segments.

The conversion from octet to analog voltage is well known, and as stated above, is based on a system called $\mu$-law coding in North America and A-law coding in Europe. Theoretically, there are 256 points represented by the 256 possible octets, or $\mu$-law codewords. The format of the $\mu$-law codewords is shown in FIG. 4, where the most significant bit $b_7$ indicates the sign, the three bits $b_6$–$b_4$ represent the linear segment, and the four bits, $b_0$–$b_3$ indicate the step along the particular linear segment. These points are symmetric about zero; i.e., there are 128 positive and 128 negative levels, including two encodings of zero. Since there are 254 non-zero points, the maximum number of bits that can be sent per signaling interval (symbol) is just under 8 bits. A $\mu$-law or A-law codeword may be referred to herein as a PCM codeword. It is actually the PCM codeword that results in the DTN 20 codec to output a particular analog voltage. The codeword and the corresponding voltage may be referred to herein as "points."

Other factors, such as robbed-bit signaling, digital attenuation (pads), channel distortion and noise introduced by the subscriber loop, and the crowding of points at the smaller voltage amplitudes and the associated difficulty in distinguishing between them at the decoder/receiver, may reduce the maximum attainable bit rate. Robbed Bit Signaling (RBS) involves the periodic use of the least significant bit (LSB) of the PCM codeword by the DTN 20 to convey control information. Usually the robbed bit is replaced with a logical '1' before transmission to the client 40. In addition, due to the fact that a channel might traverse several digital networks before arriving at the terminus of the DTN 20, more than one PCM codeword per 6 time slots could have a bit robbed by each network, with each network link robbing a different 1 sb.

To control power levels, some networks impose digital attenuators that act on the PCM codewords to convert them to smaller values. Unlike most analog attenuators, a network digital attenuator (NDA) is not linear. Because there are a finite number of digital levels to choose from, the NDA will be unable to divide each codeword in half. This causes distortion of the analog level ultimately transmitted by the codec over the subscriber loop 50. RBS and an NDA can coexist in many combinations. For example, a PCM interval could have a robbed bit of type '1', followed by an NDA followed by another robbed bit of type '1'. This could happen to a byte if a channel goes through a bit-robbed link, then through an NDA, then another bit-robbed link before reaching the DTN 20 codec.

It is evident that the above-described data transmission system imposes many constraints on the points that may be used to form a signal constellation. Inter alia, the octets will always be converted to non-linearly spaced voltage pulses in accordance with $\mu$-law or A-law conversion; 1 sbs may be robbed during some time slots making some points unavailable in that time slot; digital attenuators may make some points ambiguous; and noise on the local loop may prevent the use of closely spaced points for a desired error rate.

2. Shell Mapping

Shell mapping is a prior art technique of assigning transmit data bits to constellation points, or symbols. Shell mapping requires that an encoder group symbols together in mapping frames, typically consisting of eight symbols. The constellation is divided into a set of rings that are generally concentric, with an equal number of points per ring. A block of transmit data bits is then used to select a sequence of ring indices and to select the points to send from each of the selected rings.

For purposes of determining the most desirable sequence of rings to select, each ring is assigned a cost value associated with its distance from the origin. The costs are generally representative of the power needed to transmit a point from within that ring. For each possible sequence of rings, a total cost is calculated. The ring index selector/encoder is designed to prefer the least-cost ring sequences, i.e., low-powered point sequences are preferred over high-power point sequences. Note that the above scheme of eliminating certain ring sequences is only possible when there is signal set redundancy. This requires the constellations to be larger than would otherwise be required in systems that do not utilize shell mapping. Furthermore, because the excluded ring sequences are those that include large numbers of outer rings and the favored ring sequences are those that include large numbers of inner rings, the transmitted constellation points will have a non-equi-probable distribution. As a result, the shell mapping technique tends to reduce average power for a given spacing between points (called $d_{min}$), thereby increasing the peak-to-average power ratio (PAR).

The reduction in average power (compared to an equi-probable point distribution) can be exploited in an average power constrained system by increasing the distance between points until the average power is equal to an equivalent system with equi-probable point distribution. The receiver sees points with improved $d_{min}$ that are easier to detect in the presence of noise. Generally, the possible improvement is less than 2.0 dB, and the practically realizable benefit is about 0.5 to 1.0 dB.

The advantage of shell mapping applies to a system where the points are equally distributed within the signal space. This means that the spacing between points in the center of the constellation is the same as the spacing between points at the outer edge. This is not the case in PCM modems where the constellation points are inherently unequally spaced. There is a strong incentive to minimize constellation size in such a scenario. As shown in FIG. 3, the codes in a PCM codec are arranged in segments of 16 members each, with each higher amplitude segment having twice the spacing of the next lower segment. Constellation expansion involves adding more low-power points that are spaced closer together than high-power points. In some cases, the addition of a single point can reduce minimum spacing dramatically. Thus the idea of expanding the constellation to achieve better $d_{min}$ in may have the opposite effect, and reduce it.

It is clear that shell mapping has disadvantages when utilized in a system having constraints on signal point selection that are inherent in PCM modems. Described herein is an improved shell mapping method that includes the features of Multiple Modulus Conversion to obtain an effective signal mapping technique.

SUMMARY OF THE INVENTION

The method of the present invention referred to as Multiple Modulus Shell Mapping (MMSM) provides a combined frame mapping technique that uses aspects of Minimum Modulus Conversion (MMC) and Shell Mapping (SM) to map data bits to a sequence of data symbols, or points. The MMSM apparatus includes a shell mapper to generate ring indices from K data bits, and a modulus converter to select the signal points from within the ring based on B data bits. MMSM permits the use of constellations having any integer number of points per ring. MMSM also accommodates variations in the constellations from time-slot to time-slot within a frame. The number of rings in each constellation remains constant, but the moduli vary. MMSM produces $d_{min}$ equal to the best of MMC and SM, and in some cases $d_{min}$ may be better than that for either MMC or SM.

BRIEF DESCRIPTION OF THE DRAWINGS

The foregoing and other objects, features and advantages of the present invention will be more readily appreciated upon reference to the following disclosure when considered in conjunction with the accompanying drawings, in which.

DETAILED DESCRIPTION OF THE PREFERRED EMBODIMENT

Figure 4:
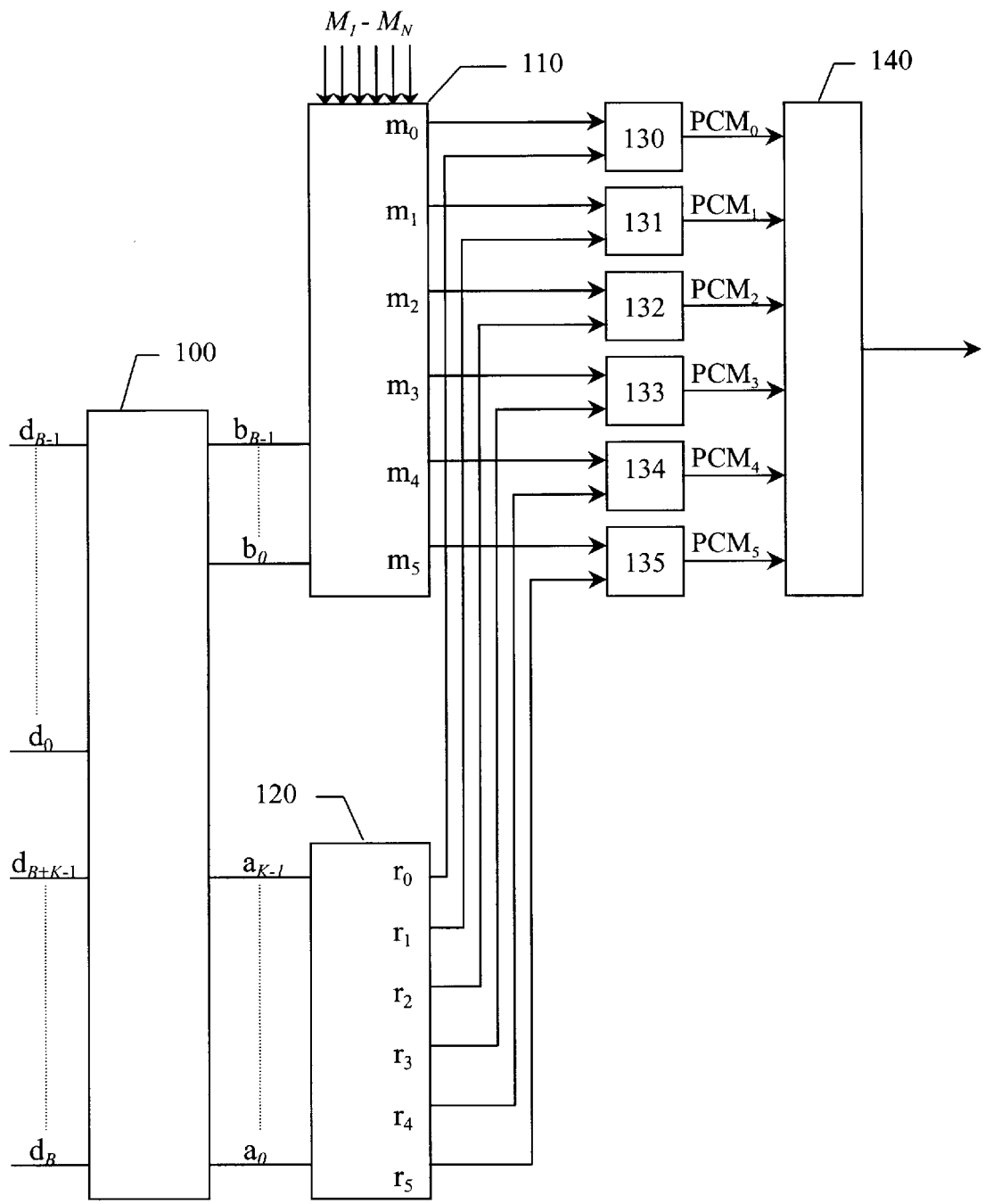
FIG. 4 shows a block diagram of a preferred embodiment of the Multiple Modulus Shell Mapper.

A preferred Multiple Modulus Shell Mapping device, in accordance with the present invention, is shown in FIG. 4. The MMSM device includes a bit parser 100, modulus converter 110, shell mapper 120, point selectors 130–136, and parallel to serial converter 140. The input data bits are scrambled, as is known in the art, to ensure bit transitions even if the actual data is an all zero data stream. Bit parser 100 divides the bits into modulus mapping bits $b_0$ through $b_{B-1}$ and shell mapping bits $a_0$, through $a_{K-1}$. As described below, the modulus converter 110 converts the B bits $b_0$–$b_{B-1}$ into N (six) multiple modulus coefficients $m_0$ through $m_5$, based on the predetermined moduli $M_1$ through $M_N$. The shell mapper 120 maps the K bits $d_B$ through $d_{B+K-1}$ to ring indices $r_0$ through $r_5$ based on a table look-up or, preferably, on well known mapping algorithms. The ring indices $r_0$ through $r_5$ take on integer values from 0 to R-1, where R is the number of rings. The point selectors 130–135 determine the actual point to be transmitted based on inputs from the modulus converter 110 and shell mapper 120, and provide the corresponding PCM codewords at their outputs. Parallel to serial converter 140 outputs the PCM codewords in a serial fashion. The preferred MMSM operates on a data frame of N=6 symbols. Other frame sizes may alternatively be used. The transmitter and 5receiver during an initiation process negotiate the remaining parameters K, B, $M_i$, and R.

Figure 5:
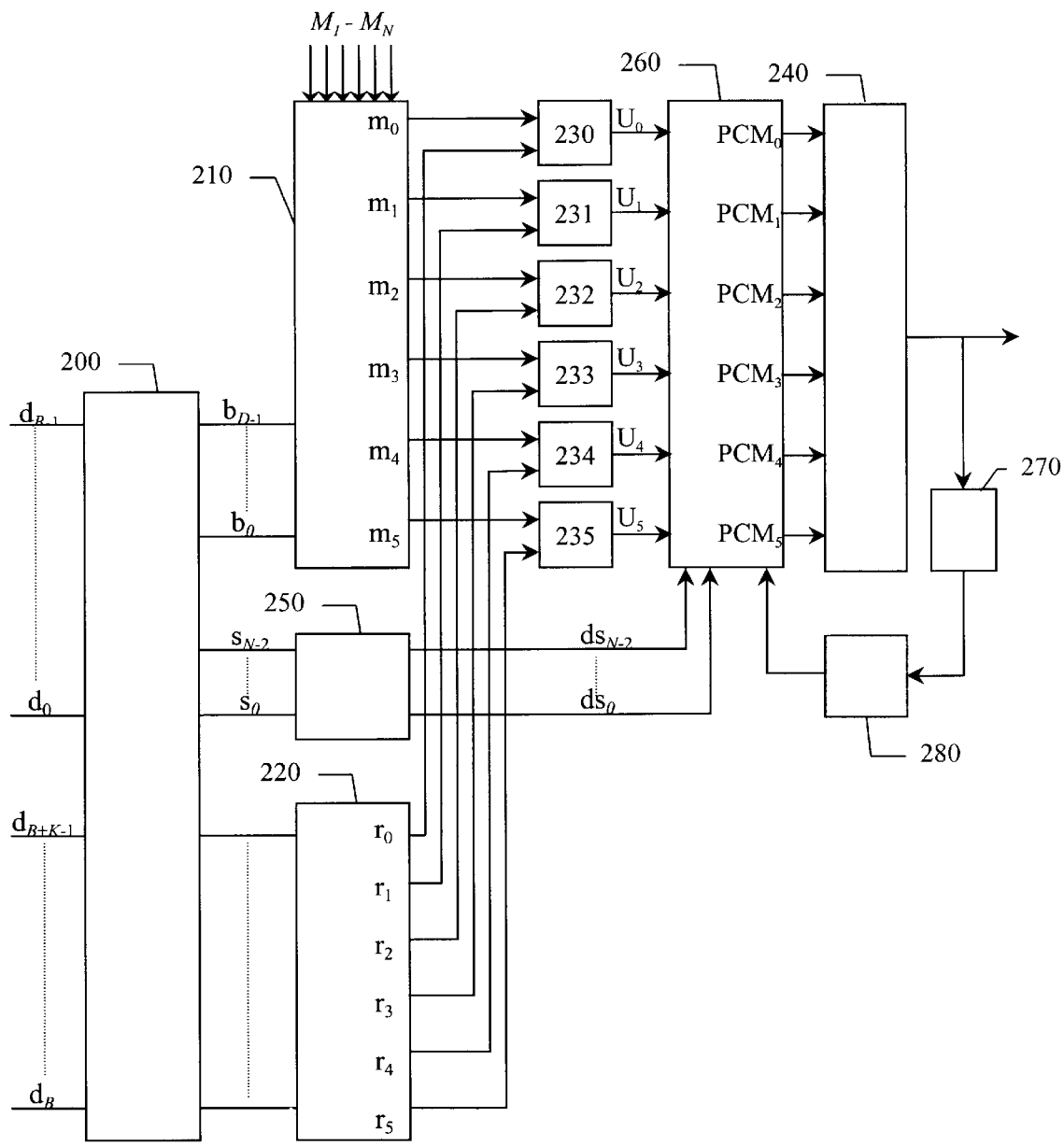
FIG. 5 shows a block diagram of an alternate preferred embodiment of the Multiple Modulus Shell Mapper.

FIG. 5 depicts an alternative preferred embodiment of the Multiple Modulus Shell Mapper that includes sign mapper 260, differential sign bit encoder 250, PCM codeword-to-linear codeword converter 270, and integrator 280. Instead of using all B bits in the modulus converter 210, only D bits are used, where D=B−N+1. The outputs of the point selectors provide unsigned points $U_0$ through $U_5$ (i.e., codewords containing the seven least significant bits, without the sign bit). In this description, N is again assumed to be six. Other frame sizes may alternatively be used.

The remaining N−1 bits are designated $s_0$ through $S_{N-2}$, and are differentially encoded into bits $ds_0$ through $ds_{N-2}$, by differential sign bit encoder 250. The output of differential sign bit encoder 250 is sent to sign mapper 260. Sign mapper 260 uses the N−1bits (which is preferably five bits in a frame of six symbols) to assign sign bits to five of the six unsigned points $U_0$ through $U_5$. The five lowest magnitude unsigned points are given sign bits in this manner. Sign mapper 260 also provides DC compensation by providing a sixth sign bit based on the DC offset signal provided by the running sum integrator 280. The sign mapper 260 inserts a sign bit in the largest magnitude unsigned point (or first largest in the event that two are equal magnitude) that is opposite the sign of the DC offset. DC offset will tend to be decreased in this manner.

Alternative DC compensation schemes may be used that insert a compensation sign bit every other frame, or 1 bit in every three frames, etc. Furthermore, schemes may be used that insert a compensation bit in every time slot of every frame. Further details of the DC compensation aspect of the sign mapper are described in co-pending application, serial number 08/871,220, filed Jun. 9, 1997, entitled Frame-Based Spectral Shaping Method And Apparatus, Attorney Docket Number 96,2058, the contents of which is hereby incorporated herein by reference.

Ring Sequence Selection

To select the N ring indices $r_i$, the improved mapping method and apparatus uses certain aspects of the prior art shell mapping devices. The sequence of rings may be stored in a lookup table or may be derived from well-known shell mapping algorithms. One such algorithm is set forth in Recommendation V.34, an international standard set forth by the International Telecommunication Union.

Shell mapping requires a mapping frame consisting of N symbols into which K+B bits will be mapped. The preferred data frame size is N=6, although other frame sizes may be used. The frame size of six is desirable because robbed bit signaling typically occurs every sixth octet of a DS-0 channel.

The constellation is divided into R rings with $M_i$ points per ring. In every frame a data parser allocates K bits per frame to ring selection and B bits per frame to point selection in the base rings. The shell mapper uses the K bits to generate N ring indices $r_i$, $0 \leq r_i < R$ using an algorithm for selecting $r_i$ such that there is a unique mapping between the K input data bits and the sequence of $r_i$. The K bits are recoverable from the ring indices $r_i$ by a similar algorithm at the decoder. The possible combinations of K bits is $2^K$ and the number of possible combinations of rings is $R^N$, so this imposes the restriction that $2^K \leq R^N$, however, for most cases $R^N$ will be strictly larger than $2^K$ to provide signal set redundancy for shaping gain.

Set forth below is a program that may be used to generate the shell mapping indices in accordance with the preferred frame duration of six time slots and R =9 rings. The program also includes the decoder algorithm. The program is written in the Matlab language, which is widely used in the engineering community. The reader should be aware that the choice of variable names are not identical to those defined above; however, the variable assignments will be clear from the context of the program.

```
% sm6.m
%
% This program performs shell mapping and inverse mapping.
% The frame size is 6.
% The ring indices will be contained in R6.
%
clear all;
M = 9;    % Number of rings
Xstart = 300000;%64317;%240000  % Start of data to be
                                 % shell mapped
err=0;
N=1;%36000;      % Number of Ring indices to compute
R6 = zeros(N,6);  % Ring indices
% Get z6
g1 = [ones(M,1)' zeros(M-1,1)'];
g2 = conv(g1,g1);
g3 = conv(g1,g2);
g6 = conv(g3,g3);
z6 = zeros(length(g6),1);
for i = 1:length(g6),
    z6(i+1) = sum(g6(0+1:(i-1)+1));
end;
for n=1:N,       % Start ring indices loop
X = Xstart+n-1;
% Find the index, i, in z6, s.t. z6(i) <= X
i=0;
while (X >= z6(i+1))
    i = i+1;
end;
i=i-1;    % Adust i due to while loop
% Compute the residue, r6
r6 = X - z6(i+1);
% Now compute the ring indices
% r6
z = r6;
s=-1;
while (z >= 0)
    s = s+1;
    z = z - g3(s+1)*g3((i-s)+1);
end;
% At this point s and (i-s) remain fixed
% r31
z = z + g3(s+1)*g3((i-s)+1);
r3 = z;
r31 = rem(r3,g3(s+1));
z = r31;
j=-1;
while (z >= 0)     % s is fixed and j=0,1,...,s
    j = j+1;
    z = z - g2((s-j)+1);
end;
z = z + g2((s-j)+1);
r21 = z;
% Get the ring indices (R1,R2,R3)
R6(n,1) = j;
if ((s-j) <= M-1)
    R6(n,2)=r21; R6(n,3)=(s-j)-r21;;
else
    R6(n,2)=(s-j)-(M-1) + r21; R6(n,3)=(M-1)-r21;
end;
% r32
r32 = floor(r3/g3(s+1));
z = r32;
j=-1;
while (z >= 0)    % (i-s) is fixed and j=0,1,...,(i-s)
    j = j+1;
    z = z - g2(((i-s)-j)+1);
end;
z = z + g2(((i-s)-j)+1);
r22 = z;
% Get the ring indices (R4,R5,R6)
R6(n,4) = j;
if ((i-s)-j <= M-1)
    R6(n,5)=r22; R6(n,6)=((i-s)-j)-r22;;
else
    R6(n,5)=((i-s)-j)-(M-1)+r22; R6(n,6)=(M-1)-r22;
end;
% *** Decode = inverse shell mapping
% Get rr31
ss = sum(R6(n,1:3));
jj = R6(n,1);
if ((ss-jj) <= (M-1))
    rr21 = R6(n,2);
else
    rr21 = (M-1)-R6(n,3);
end;
rr31=rr21;
for k=0:jj-1,
    rr31 = rr31 + g2(ss-k+1);
end;
% Get rr32
ss = sum(R6(n,4:6));
jj = R6(n,4);
if ((ss-jj)) <= (M-1))
    rr22 = R6(n,5);
else
    rr22 = (M-1)-R6(n,6);
end;
rr32=rr22;
for k=0:jj-1,
    rr32 = rr32 + g2(ss-k+1);
end;
% Finish decode = inverse SM
ii = sum(R6(n,:));
ss = sum(R6(n,1:3));
% Get rr6
rr6 = rr32*g3(ss+1) + rr31;
for k=0:ss-1,
    rr6 = rr6 + g3(k+1)*g3(ii-k+1);
end;
XX = z6(i+1)+rr6;     % Decoded data
if (XX ~= X)
    err = err+1;
end;
if (mod(X,1000)== 0)
```

```
    X
    err
end;
end;    % End data loop
```

Multiple Modulus Conversion

Figure 1:
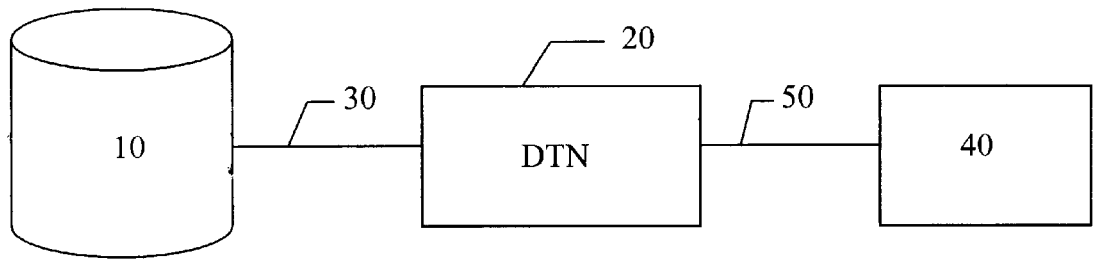
FIG. 1 depicts a communications network with a data source having direct digital access to the DTN.
Figure 2:
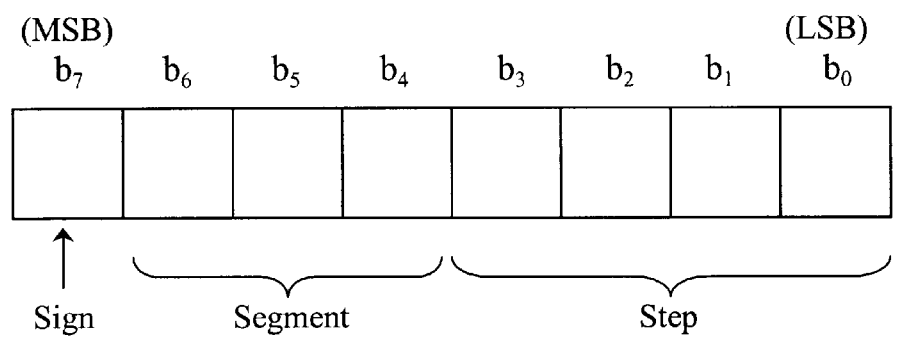
FIG. 2 shows the elements of a µ-law codeword.
Figure 3:
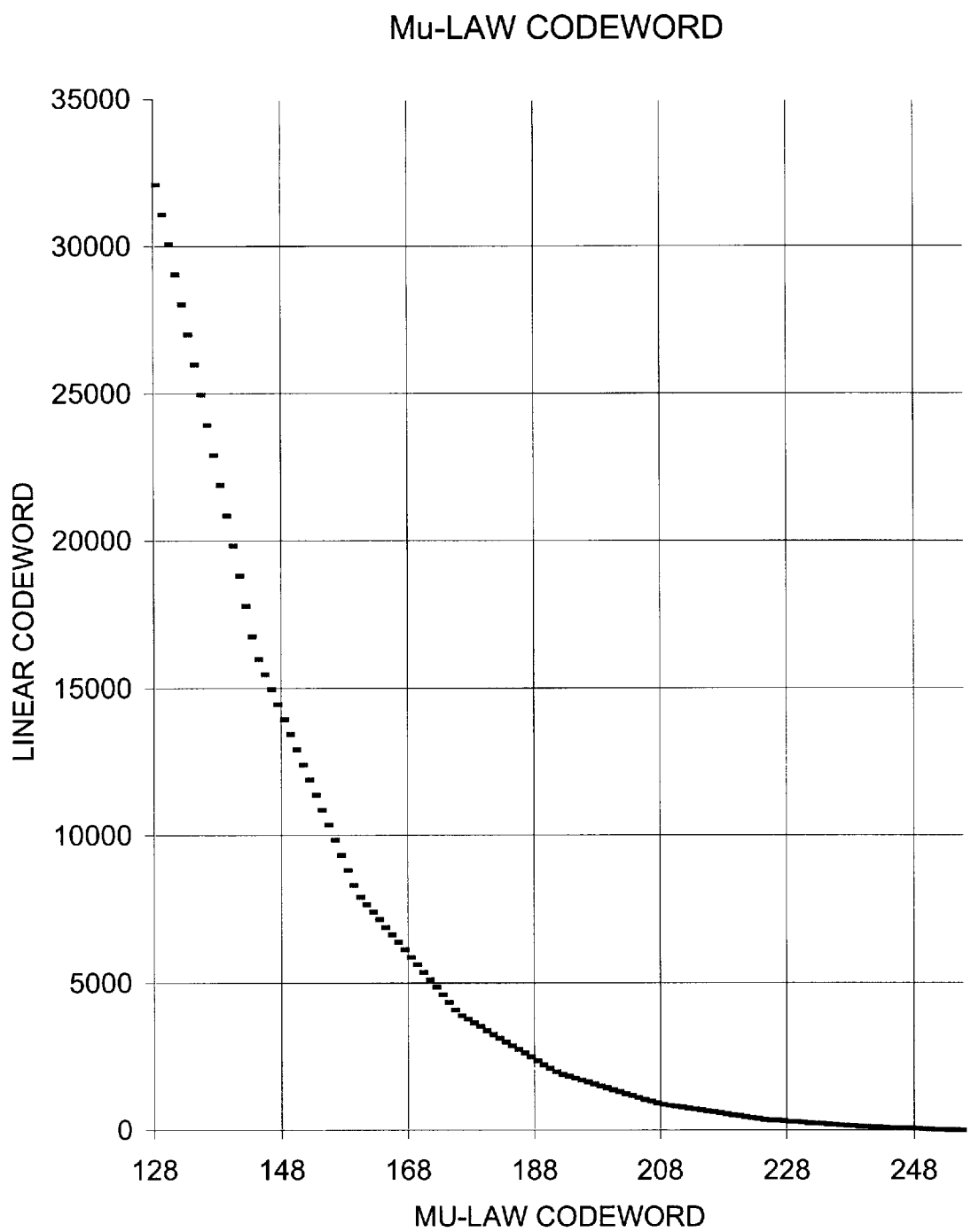
FIG. 3 shows a µ-law to linear conversion graph.

Multiple Modulus Conversion (MMC), without shell mapping, has been described for use in a communication system, such as the system shown in FIG. 1, in U.S. Provisional Patent Application Ser. No.60/030,843, filed Oct. 15, 1996, entitled "Efficient Data Transmission Over Digital Telephone Networks using Multiple Modulus Conversion", the contents of which are incorporated herein by reference.

Generally, Multiple Modulus Conversion provides a method of converting blocks of binary data to a corresponding block of $M_1$-ary, $M_2$-ary, . . ., $M_n$ symbols to maximize the data rate while minimizing the required Signal-to-Noise Ratio (SNR) to achieve a desired error rate. The approach allows for tight constellation packing and constellation balancing, so that a minimum number of constellation points are required for a given bit capacity, and the error rate is not dominated by any one symbol interval. The net result is a lowering of the required SNR to achieve a desired error rate. Note that a consequence of using MMC is that it allows a non-integer number of bits to be mapped to each symbol, which increases efficiency, because the constellation sizes are not restricted to powers of two (i.e., a fractional number of bits/symbol are allowed.)

As a simple example, in a system having one RBS link in the sixth time slot of a 6 slot frame, the block of data is converted to a multi-digit modulo-$M_1$ number (where each digit represents an $M_1$-ary symbol) followed by a single digit modulo-$M_2$ number (representing an additional $M_2$-ary symbol). The concatenated symbols, or digits of the modulo-$M_1$ and modulo-$M_2$ numbers, are then transmitted in binary format as eight-bit bytes, or octets, through the DTN 20 where each octet represents a symbol. At the local loop 50 on the receiver end of the link, the DTN 20 codec converts the octets to analog voltages corresponding to the $M_1$-ary and $M_2$-ary symbols. The block of symbols may then be decoded at the client 40 by a reverse modulus conversion to recover the binary data.

The MMC method therefore provides a general method for mapping data to a multi-symbol number having various moduli that allows for tighter constellation packing and constellation balancing. As a result, a minimum number of constellation points are required for a given bit capacity, and the error rate is not dominated by any one symbol interval. Furthermore, MMC lowers the required SNR to achieve a desired error rate.

To implement MMC, constellations consisting of $M_i$ points are selected to meet the following three criterion:

$$1. \ 2^K \leq \prod_{i=1}^{n} M_i,$$

where K is the number of user bits to be transmitted in an n symbol frame.

2. Points in constellations used in RBS intervals should be chosen such that the lsbs in their corresponding $\mu$-law codes are least affected by RBS. (Note these constellations will usually be smaller than the ones used in non-RBS intervals, since less data is sent during this time.)

3. The probability of symbol error is minimized and balanced. Minimizing the probability of symbol error is accomplished by choosing points with maximal spacing, while constraining the points to have some specified average power. In addition, the number of points with minimum spacing should be minimized (smallest number of nearest neighbors). Balancing the symbol error probability, means that mutually, the $M_i$ should have about the same symbol error rate, since then the overall error rate (frame or block error rate, for example) will not be dominated by the symbol error rate of any one constellation.

In MMC, the values of the $M_i$ and their corresponding constellation sets are ultimately determined by the SNR of the channel and the impairments within the network. One of ordinary skill in the art can appreciate that the SNR can be determined in a number of ways, for example during an initialization period, a sequence of known codewords may be transmitted to produce a known sequence of symbols by the DTN's codec, and the variance from the expected symbols (points) is measured. Once the SNR is determined, a search method can be employed to determine the $M_i$'s and their corresponding constellations. The constellations are chosen from the PCM codewords that satisfy the three criteria cited above. That is, search for N sets of points, corresponding to N symbols per frame, and having N moduli, which simultaneously minimizes the desired probability of symbol error, while satisfying the data rate criterion number 1.

Signal Point Selection Using MMC

In prior art shell mappers, Qi bits are used to select the point from the designated ring $r_i$, with each ring containing $2^{Qi}$ points. The following relationship must be met in prior art shell mappers:

$$B = \sum_i Qi \qquad (\text{eq. 1})$$

In contrast to the prior art methods, the present invention uses a multiple modulus conversion technique to select the points in the base ring. Multiple Modulus Conversion removes the $2^{Qi}$ points per ring restriction associated with prior art shell mapping techniques and allows any integer number of points per ring. There can be up to N unique moduli $M_i$ per frame of length N. The moduli are held to the less strict requirement that the product of moduli is greater than or equal to $2^B$, i.e., $$2^B \leq \prod_{i=0}^{N-1} Mi, \qquad (\text{eq. 2})$$

where B bits per frame are allocated to multiple modulus conversion for the purpose of assigning points to the base ring, and i is an index for the slot within the frame.

In accordance with the preferred embodiments, the constellations to be used are agreed upon in a negotiating process between the transmitter and receiver based upon the level of noise and upon network impairments such as RBS and NDAs. The number of rings R (and hence the moduli $M_i$) preferably are also agreed upon. Each constellation is equally divided into R rings where $M_i$ is the number of points per ring for the time slot i within the frame. In the system of FIG. 4, each of the rings includes positive PCM codewords (or points) and the corresponding negative PCM codewords (or points). Note that in the system of FIG. 5, the modulus $M_i$ is equal to the number of positive points because the sign is assigned after the modulus conversion. The modulus converter collects K bits to send during the N symbol frame. The following process allows the K bits to be mapped to N indices, $m_i$.

The next step of the conversion process is to represent the K bits as an integer, I, where:

$$I = b_0 + b_1 2 + b_2 2^2 + \ldots + b_{B-1} 2^{B-1}. \quad \text{(eq. 3)}$$

In eq. 3, $b_0$ is the lsb and $b_{B-1}$ is the msb (most significant bit) of the B-bit data block.

The number I may be represented as:

$$I = m_1 + m_2 M_1 + m_3 M_2 M_3 + \ldots + m_N M_1 M_2 \ldots M_{N-1} \quad \text{(eq. 4)}$$

The result of the modulus conversion process is the production of the values $M_i$, i=1, ... N, where the values of the $m_i$ are constrained to the interval $0 \leq m_i < M_i$. The N values of $m_i$ generally correspond to N analog levels that will be produced by the network's codec. The moduli $M_i$ may be referred to herein as "base moduli" to distinguish them from the "moduli indices," $m_i$ which are the coefficients of the base moduli in eq. 4.

A simple algorithm can be used for generating the $m_i$, given the $M_i$, as follows:

For j=1, ... , N
$I = I/M_i$
$Q = \text{Int}(I)$
$F = I - Q$
$m_{i=Mi} *F$
$I = Q$
Next j The $m_i$ are indices to symbols that are conveyed by the encoder/server to the receiver by transmitting to the DTN the codewords corresponding to the appropriate points. At the decoder, the process of decoding or recovering the B data bits involves identifying the correct symbol indices $m_i$ from the analog voltages sent over the receiver's subscriber loop and then unmapping these indices through Reverse Multiple Modulus Conversion.

One method of decoding the symbols is to first restore the integer I from the recovered indices $m_i$. The following algorithm may be used:

I=0
For j=1, ... , N
$I = M_{N-j+1} * I + m_{N-j+1}$
Next j

From I, the B bits in the frame can be recovered in a straightforward manner.

Note that in the alternative preferred embodiment of FIG. 5, a subset of the B bits are used by the modulus converter 210. These bits are converted using the above-described algorithm, with the understanding that the moduli $M_1$ through $M_N$ are selected appropriately. Because the sign of the PCM codeword is assigned after the modulus conversion of converter 210, the $M_1$–$M_N$ of FIG. 5 are one half the values of an exactly equivalent system of FIG. 4. Obviously an exact equivalent will not exist when any of the moduli of FIG. 4 are odd—this observation is made only to clarify the relationship between the systems of FIGS. 4 and 5. In practice, if DC compensation is implemented as in FIG. 5, optimal values of $M_1$–$M_N$ will be chosen for that scenario.

The parameters needed to describe the mapping algorithm for the transmitter are K ring selection bits, B point selection bits are used for selecting the points from within the rings based on the multiple modulus conversion, R is the number of rings within the constellation, and $M_i$ are the moduli for each time slot denoted by subscript i. By making K=O (or R=1) the mapping scheme collapses to MMC. By making $M_i = 2^{Qi}$ the mapping scheme collapses to SM. In some instances (e.g., for a given constellation) collapsing to one scheme or the other provides the best results. In most cases however, the MMSM technique gives the best result.

A mapping scheme has been described that combines shell mapping and multiple modulus conversion. The combination collapses to either scheme at the discretion of the receiver. This allows the receiver total flexibility to be able to achieve the largest $d_{min}$ at all data rates. The complexity increase in the transmitter is small compared to that of straight shell mapping. The complexity increase over multiple modulus conversion is significantly greater. In the receiver there is little complexity increase due to the decoder. However, as the choice of mapping lies with the receiver, the receiver does not have to accept any additional complexity due to this scheme.

A preferred embodiment of the present invention has been described herein. It is to be understood, of course, that changes and modifications may be made in the embodiment without departing from the true scope of the present invention, as defined by the appended claims.

We claim:

1. A method of mapping data bits to a sequence of signal points selected from a signal constellation wherein the points in the signal constellation are equally divided into rings, the method comprising the steps:

segmenting a plurality of data bits into a first block and a second block;

selecting a sequence of ring indices $r_i$ in response to said first block;

determining a sequence of moduli indices $m_i$ in response to said second block wherein at least one of said moduli indices has a base modulus that is a value other than a power of two;

selecting a signal point sequence in response to the sequence of ring indices $r_i$ and the sequence of moduli indices $m_i$.

2. The method of claim 1 wherein the determining step further comprises the steps of:

forming an integer equivalent I of the second block;

iteratively dividing the integer into modulus coefficients.

3. The method of claim 1 further comprising the steps of:

segmenting said second block into a first and second portion, wherein said first portion is used to determine a sequence of moduli indices;

generating sign bits in response to said second portion;

appending said sign bits to said moduli indices.

4. The method of claim 3 wherein said generating step comprises the step of differentially encoding said second portion.

5. The method of claim 1 further comprising the step of detecting a DC offset, and wherein the selecting step is performed in response to said DC offset.

6. The method of claim 1 wherein said signal point sequence has a length of six signal points.

7. An apparatus for mapping data bits to a sequence of signal points selected from a signal constellation wherein the points in the signal constellation are equally divided into rings, comprising:

a bit parser for segmenting input data bits into a first block and a second block;

a ring index generator for generating ring indices in response to said first block;

a multiple modulus converter for generating moduli indices in response to said second block wherein at least one of said moduli indices has a base modulus that is a value other than a power of two; and signal point selection blocks for selecting points from the constellation in response to said ring indices and said moduli indices.

8. The apparatus of claim 7 further comprising:

a sign mapper for appending a sign bit to said moduli indices;

and wherein said bit parser further segments input data bits into a third block, wherein said sign mapper generates said sign bits in response to said third block.

9. The apparatus of claim 8 further comprising:

a differential encoder connected between said bit parser and said sign mapper for differentially encoding said third block.

10. The apparatus of claim 8 further comprising:

an integrator connected to said parallel to serial converter for determining a DC offset.

11. The apparatus of claim 10 wherein said sign mapper is responsive to said integrator.

12. The apparatus of claim 10 further comprising:

a PCM to linear converter connected between said serial to parallel converter and said integrator to provide linear values to said integrator.

13. An apparatus for mapping data bits to a sequence of signal points selected from a signal constellation wherein the points in the signal constellation are equally divided into rings, comprising:

a bit parser for segmenting input data bits into a first block and a second block;

a ring index generator for generating ring indices in response to said first block;

a multiple modulus converter for generating moduli indices in response to said second block wherein the moduli indices have a plurality of base moduli wherein at least one of the plurality of base moduli is not a power of two and wherein at least two of the plurality of base moduli are not the same value; and signal point selection blocks for selecting points in response to said ring indices and said moduli indices.

* * * * *